(12) United States Patent
Hiraiwa

(10) Patent No.: US 9,849,735 B2
(45) Date of Patent: Dec. 26, 2017

(54) RUN FLAT TIRE

(71) Applicant: TOYO TIRE & RUBBER CO., LTD., Osaka-shi, Osaka (JP)

(72) Inventor: Akie Hiraiwa, Osaka (JP)

(73) Assignee: TOYO TIRE & RUBBER CO., LTD., Osaka-shi (JP)

(*) Notice: Subject to any disclaimer, the term of this patent is extended or adjusted under 35 U.S.C. 154(b) by 0 days.

(21) Appl. No.: 14/813,525

(22) Filed: Jul. 30, 2015

(65) Prior Publication Data
US 2016/0031268 A1 Feb. 4, 2016

(30) Foreign Application Priority Data

Aug. 1, 2014 (JP) .................. 2014-158030

(51) Int. Cl.
| | | |
|---|---|---|
| B60C 17/00 | (2006.01) | |
| C08J 5/00 | (2006.01) | |
| C08L 9/00 | (2006.01) | |
| C08L 7/00 | (2006.01) | |
| C08L 61/12 | (2006.01) | |
| C08K 3/04 | (2006.01) | |
| C08K 5/09 | (2006.01) | |
| C08K 3/22 | (2006.01) | |
| C08K 5/18 | (2006.01) | |
| C08K 5/3437 | (2006.01) | |
| C08K 5/47 | (2006.01) | |
| C08K 3/06 | (2006.01) | |
| C08K 5/378 | (2006.01) | |
| C08K 5/3492 | (2006.01) | |
| B60C 1/00 | (2006.01) | |

(52) U.S. Cl.
CPC .......... B60C 17/0009 (2013.01); C08J 5/00 (2013.01); C08K 3/04 (2013.01); C08K 3/06 (2013.01); C08K 3/22 (2013.01); C08K 5/09 (2013.01); C08K 5/18 (2013.01); C08K 5/3437 (2013.01); C08K 5/3492 (2013.01); C08K 5/378 (2013.01); C08K 5/47 (2013.01); C08L 7/00 (2013.01); C08L 9/00 (2013.01); C08L 61/12 (2013.01); B60C 2001/0033 (2013.01); B60C 2017/0054 (2013.01); C08J 2309/00 (2013.01); C08J 2407/00 (2013.01)

(58) Field of Classification Search
CPC ........ B60C 17/0009; B60C 2001/0033; B60C 2017/0054; C08J 5/00; C08J 2407/00; C08J 2309/00; C08L 9/00; C08L 7/00; C08L 61/12; C08K 3/04; C08K 5/09; C08K 3/22; C08K 5/18; C08K 5/3437; C08K 5/47; C08K 3/06; C08K 5/378; C08K 5/3492

USPC ................................................... 152/517
See application file for complete search history.

(56) References Cited

U.S. PATENT DOCUMENTS

| | | |
|---|---|---|
| 5,131,445 A | 7/1992 | Tokieda et al. |
| 5,253,691 A | 10/1993 | Scriver |
| 5,464,899 A | 11/1995 | Freeman et al. |
| 5,859,101 A | 1/1999 | Kikkawa et al. |
| 6,196,289 B1 | 3/2001 | Yoshioka |
| 6,494,242 B2 | 12/2002 | Cottrell |
| 7,900,667 B2 | 3/2011 | Vasseur |
| 2006/0219343 A1 | 10/2006 | Hochi |
| 2008/0295941 A1 | 12/2008 | Shiraishi |
| 2009/0095394 A1* | 4/2009 | Kameda ............ C08K 5/12 152/510 |
| 2010/0112365 A1 | 5/2010 | Obrecht et al. |
| 2011/0172339 A1 | 7/2011 | Satou |
| 2011/0290396 A1 | 12/2011 | Nakagawa et al. |
| 2012/0152425 A1 | 6/2012 | Kawashima et al. |
| 2013/0037193 A1 | 2/2013 | Horiuchi |
| 2013/0158163 A1 | 6/2013 | Yagi et al. |
| 2015/0306921 A1* | 10/2015 | Hiraiwa ............ B60C 17/0009 152/517 |

FOREIGN PATENT DOCUMENTS

| | | |
|---|---|---|
| CN | 101407603 A | 4/2009 |
| CN | 101484311 A | 7/2009 |
| CN | 102264552 A | 11/2011 |
| CN | 103124765 A | 5/2013 |
| CN | 103374151 A | 10/2013 |
| JP | 58122946 A * | 7/1983 |
| JP | S58-122946 A | 7/1983 |
| JP | H03-176213 A | 7/1991 |
| JP | 2001-80319 A | 3/2001 |
| JP | 2004-276699 A | 10/2004 |
| JP | 2007-70373 A | 3/2007 |
| JP | 2007-331422 A | 12/2007 |
| JP | 2008-189911 A | 8/2008 |

(Continued)

OTHER PUBLICATIONS

Office Action dated Jun. 29, 2016, issued in Chinese Patent Application 201510159519.9, with abridged English translation. (10 pages).

(Continued)

*Primary Examiner* — Angela C Scott
(74) *Attorney, Agent, or Firm* — Westerman, Hattori, Daniels & Adrian, LLP

(57) ABSTRACT

A run flat tire having improved run flat durability is provided. The run flat tire has a side wall part reinforced by a side reinforcing rubber part, and the side reinforcing rubber part is formed by a rubber composition which comprises 100 parts by mass of a diene rubber containing natural rubber and polybutadiene rubber, and from 0.1 to 4.0 parts by mass of a mercaptobenzimidazole compound.

5 Claims, 1 Drawing Sheet

(56) References Cited

FOREIGN PATENT DOCUMENTS

| JP | 2010-132168 A | 6/2010 |
|---|---|---|
| JP | 2010/074286 A1 | 7/2010 |
| JP | 2010-149632 A | 7/2010 |
| JP | 2010-285514 A | 12/2010 |
| JP | 2011-89031 A | 5/2011 |
| JP | 2011-190410 A | 9/2011 |
| JP | 2012-251017 A | 12/2012 |
| JP | 2013-216753 A | 10/2013 |
| JP | 2013-221052 A | 10/2013 |
| JP | 2013-224054 A | 10/2013 |

OTHER PUBLICATIONS

Office Action dated Sep. 30, 2016, issued in Chinese Application No. 201510289327.X, with English translation. (10 pages).
Non-Final Office Action dated Mar. 3, 2017, issued in U.S. Appl. No. 14/702,904 (6 pages).
Non-Final Office Action dated Mar. 3, 2017, issued in U.S. Appl. No. 14/721,442 (6 pages).
Non-Final Office Action dated Mar. 13, 2017, issued in U.S. Appl. No. 14/750,265 (8 pages).
Non-Final Office Action dated Feb. 21, 2017, issued in U.S. Appl. No. 14/669,561 (15 pages).
Office Action dated Nov. 22, 2016, issued in counterpart Chinese Application No. 201510419572.8, with machine tranlsation. (10 pages).
Final Office Action dated Jun. 7, 2017, issued in U.S. Appl. No. 14/669,561 (13 Pages).
Office Action dated Jul. 18, 2017, issued in Japanese Patent Application No. 2014-090478, with English machine tanslation. (9 pages).
Final Office Action dated Jun. 26, 2017, issued in U.S. Appl. No. 14/702,904. (15 pages).
Final Office Action dated Jul. 18, 2017, issued in U.S. Appl. No. 14/721,442. (13 pages).
Notice of Allowance dated Jul. 14, 2017, issued in U.S. Appl. No. 14/750,265. (19 pages).
Office Action dated Aug. 8, 2017, issued in Chinese Patent Application 201510419572.8, with machine translation. (12 pages).
Notice of Allowance dated Oct. 4, 2017, issued in U.S. Appl. No. 14/702,904 (11 pages).

\* cited by examiner

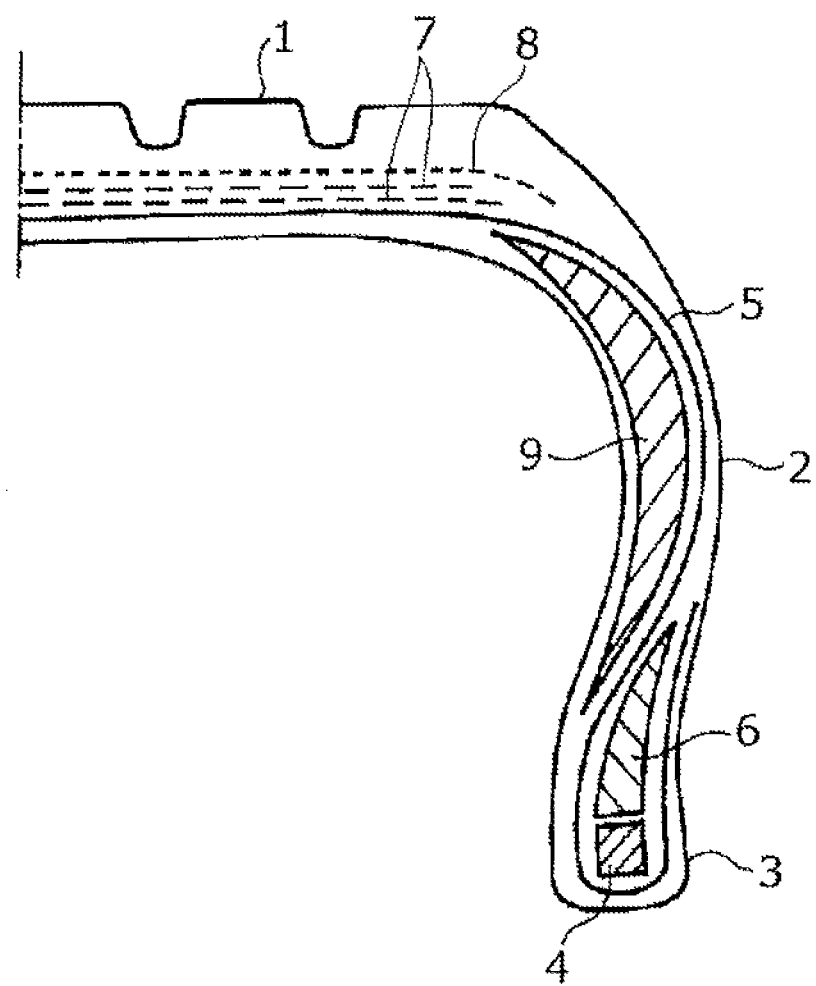

RUN FLAT TIRE

BACKGROUND OF THE INVENTION

Field of the Invention

The present invention relates to a run flat tire.

Background Art

Run flat tire means a pneumatic tire that can run in a certain extent of distance even in the state that air pressure in a tire has reduced and reached 0 kPa by tire failure such as puncture. It is known to reinforce a side wall part by providing a side reinforcing rubber part on an inner surface of the side wall part as a technique for enabling run flat running in the state that an inner pressure has reduced as above.

High hardness compounded rubber composition is frequently used in a side reinforcing rubber part to suppress deformation of a tire during run flat running (for example, see JP-A-2007-070373). However, when hardness is increased, tensile product is decreased, and there is a problem that durability effect cannot be sufficiently exerted.

The inventors of the invention have obtained the finding that the above problem can be overcome by forming a side reinforcing rubber part using a rubber composition containing a mercaptobenzimidazole compound.

Benzimidazole compound has been used in the past as an age resister, and in recent years, an attempt has been made to achieve both low heat generation and abrasion resistance of a rubber composition by using the compound.

For example, JP-A-2011-089031 discloses a rubber composition using a reinforcing filler and a benzimidazole compound having a carboxyl group or the like in predetermined amounts, and a pneumatic tire using the composition in a tread part and/or a side wall part.

JP-A-2013-216753 discloses a method for manufacturing a rubber composition for a tire tread, containing at least one selected from an amine type age resister, a phenol type age resister, a secondary age resister and a quinoline type age resister, and 2-mercaptobenzimidazole and its zinc salt are described as examples of the secondary age resister.

However, any of those patent documents does not disclose that in a run flat tire, hardness is improved without decreasing tensile product by using a mercaptobenzimidazole compound, thereby improving run flat durability.

SUMMARY OF THE INVENTION

The invention has been made on the basis of the above finding, and has an object to provide a run flat tire in which tensile product has been improved without decreasing hardness of a rubber composition, and as a result, run flat durability has been improved than a conventional one.

The run flat tire according to the invention has a side wall part reinforced by a side reinforcing rubber part, and to overcome the above-described problems, the side reinforcing rubber part is formed by a rubber composition which comprises 100 parts by mass of a diene rubber containing natural rubber and polybutadiene rubber, and from 0.1 to 4.0 parts by mass of a mercaptobenzimidazole compound.

It is preferred that the rubber composition further comprises a phenol type thermosetting resin and a methylene donor, and in this case, it is preferred that a mass ratio of the amount of the phenol type thermosetting resin contained to the amount of the methylene donor contained is 1.5 times or more.

It is preferred that the rubber composition has a ratio (M50H/M50N) of tensile stress (M50H) in 50% elongation at a measurement temperature of 100° C. to tensile stress (M50N) in 50% elongation at a measurement temperature of 23° C. of from 1.0 to 1.3.

2-Mercaptobenzimidazole, or at least one 2-mercaptobenzimidazole-based compound selected from 2-mercaptobenzimidazole having at least one alkyl substituent in an aromatic ring and their metal salts can be used as the mercaptobenzimidazole compound.

It is preferred that the rubber composition further contains at least one age resister selected from the group consisting of an aromatic secondary amine type age resister, a phenol type age resister, a sulfur type age resister and a phosphite type age resister, and a quinoline type age resister.

According to the invention, when a given amount of a mercaptobenzimidazole compound is added to the rubber composition constituting a side reinforcing rubber part of a run flat tire, tensile product can be improved while maintaining hardness, and as a result, run flat durability can be greatly improved.

When a phenol type thermosetting resin and a methylene donor are added in the above-described given proportions to the rubber composition, run flat durability is further improved.

Furthermore, when M50H/M50N that is a ratio between tensile stress at ordinary temperature that assumes a temperature during general running and tensile stress at 100° C. that assumes a temperature during running at puncture of a tire is from 1.0 to 1.3, run flat durability is further excellent and failure of a reinforcing rubber in a side part can be prevented.

BRIEF DESCRIPTION OF THE DRAWING

FIG. 1 is a half cross-sectional view of a pneumatic tire according to one embodiment.

DETAILED DESCRIPTION OF THE INVENTION

Run flat tire according to the present embodiment has a side reinforcing rubber part in its side wall part, and the side reinforcing rubber part contains a mercaptobenzimidazole compound in a given amount, thereby run flat durability is improved than a conventional one.

In the rubber composition used in the invention, a diene rubber as a rubber component contains natural rubber (NR) and polybutadiene rubber (BR). Rubbers generally used in rubber industries can be used as the natural rubber and polybutadiene rubber without particular limitation. Ratio of those rubbers contained in the rubber component is not particularly limited, and for example, the content of the natural rubber may be form 20 to 70 mass %, and may be from 30 to 60 mass %. The content of the polybutadiene rubber may be from 30 to 80 mass %, and may be from 40 to 70 mass %. Tear resistance can be improved by increasing the content of natural rubber, and bending fatigue resistance can be improved by increasing the content of polybutadiene rubber.

Polybutadiene rubber having cis-1,4 bond content of 96% or more, for example, can be used as the polybutadiene rubber. When such polybutadiene rubber having high cis content is used, low heat generation performance can be improved, and run flat durability can further be improved. The polybutadiene rubber having high cis content is preferably a rubber synthesized using a rare earth element type catalyst such as a neodymium type catalyst.

As a microstructure of the butadiene rubber synthesized using a neodymium type catalyst, it is preferred that a cis-1,4 bond content is 96% or more, and a vinyl group (1,2-vinyl bond) content is 1.0% or less. The cis-1,4 bond content and vinyl group content used herein are values calculated by integrated ratio of $^1$HNMR spectrum.

The rubber component may be constituted of only natural rubber and polybutadiene rubber, but may contain other diene rubber. The other diene rubber is not particularly limited, and examples thereof include styrene-butadiene rubber (SBR), acrylonitrile-butadiene rubber (NBR) and chloroprene rubber (CR).

Mercaptobenzimidazole compound is contained in the rubber composition used in the present embodiment. Specific examples of the mercaptobenzimidazole compound include 2-mercaptobenzimidazole, 2-mercaptobenzimidazole having at least one alkyl substituent in an aromatic ring, and metal salts of those. Example of the alkyl substituent includes methyl group. Examples of the metal salt include zinc salt, magnesium salt and calcium salt. Those mercaptobenzimidazole compounds can be used in one kind alone and can be used as mixtures of two kinds or more.

The content of the mercaptobenzimidazole compound in the rubber composition used in the present embodiment is preferably from 0.1 to 4.0 parts by mass, and more preferably from 0.1 to 3.0 parts by mass, per 100 parts by mass of the diene rubber. When the content of the mercaptobenzimidazole compound is 0.1 parts by mass or more per 100 parts by mass of the diene rubber, improvement of run flat durability which is the purpose of the invention is achieved, and when the content is 4.0 parts by mass or less, the overall balance of rubber properties becomes good.

The rubber composition used in the present embodiment preferably further contains a phenol type thermosetting resin and a methylene donor as a hardener thereof, in addition to the diene rubber.

Examples of the phenol type thermosetting resin used include thermosetting resins obtained by condensation of at least one phenol compound selected from the group consisting of phenol, resorcin and those alkyl derivatives with aldehyde such as formaldehyde, and use of the resin can attempt to increase hardness. The alkyl derivatives include derivatives by relatively long-chain alkyl group, such as nonyl phenol or octyl phenol, in addition to methyl group derivatives such as cresol or xylenol. Specific examples of the phenol type thermosetting resin include various novolac type phenol resins such as an unmodified phenol resin obtained by condensation of phenol and formaldehyde (straight phenol resin), an alkyl-substituted phenol resin obtained by condensation of an alkyl phenol such as cresol, xylenol or octyl phenol and formaldehyde, a resorcin-formaldehyde resin obtained by condensation of resorcin and formaldehyde, and a resorcin-alkyl phenol cocondensated formaldehyde resin obtained by condensation of resorcin, alkyl phenol and formaldehyde. Furthermore, for example, an oil-modified novolac type phenol resin obtained by modification with at least one oil selected from the group consisting of a cashew nutshell oil, a tall oil, a rosin oil, a linoleic acid, oleic acid and linolenic acid can be used. Those phenol type thermosetting reins can be used in any one kind alone and can be used as mixtures of two kinds or more.

At least one selected from hexamethylenetetramine and melamine derivative are used as the methylene donor contained as a hardener of the phenol type thermosetting resin. The melamine derive includes at least one selected from the group consisting of hexamethoxymethylmelamine, hexamethylolmelamine pentamethyl ether and polyhydric methylolmelamine. Of those, hexamethoxymethylmelamine and/or hexamethylenetetramine are preferred as the methylene donor, and hexamethoxymethylmelamine is more preferred.

The amount of the phenol type thermosetting resin added is not particularly limited, but is preferably from 1 to 20 parts by mass, and more preferably from 1 to 10 parts by mass, per 100 parts by mass of the diene rubber. The amount of the methylene donor added is not particularly limited, but is preferably from 0.2 to 10 parts by mass, and more preferably from 0.5 to 5 parts by mass, per 100 parts by mass of the diene rubber.

Mass ratio A/B between the amount (A) of the phenol type thermosetting resin added and the amount (B) of the methylene donor added is preferably 1.5 or more, more preferably 2.0 or more, and still more preferably 2.5 or more. The upper limit of the mass ratio A/B is preferably 5.0 or less, and more preferably 4.0 or less. When those are used in appropriate amounts, M50H/M50N ratio described hereinafter is easily set to a desired range without adversely affecting crosslinking system of a rubber, the effect of suppressing deformation of a tire during run flat running is increased, and run flat durability can be further improved.

In the rubber composition used in the present embodiment, when tensile stress in 50% elongation at a measurement temperature of 23° C. is M50N and tensile stress in 50% elongation at a measurement temperature of 100° C. is M50H, M50H/M50N that is a ratio of those preferably satisfies the following relationship. That is, in the rubber composition constituting the side reinforcing rubber part, properties of a vulcanized rubber preferably satisfies the following relationship.

$$1.0 \leq M50H/M50N \leq 1.3$$

Thus a side reinforcing rubber part having the above properties is obtained, deformation of a side wall part during run flat running is suppressed while maintaining running performance during general running, and run flat durability can be further improved.

In more detail, modulus of elasticity is decreased at high temperature in a high hardness compounded rubber composition generally used in a side reinforcing rubber part of a run flat tire. Inverting this relationship, it is preferred to use a rubber composition in which tensile stress at high temperature (100° C.) corresponding to a temperature during run flat running is the same or more than tensile stress at ordinary temperature (23° C.) corresponding to a temperature during general running.

When the tensile stress ratio M50H/M50N is 1.0 or more, decrease of stiffness during run flat running is suppressed, and run flat durability can be improved. It is preferred that tensile stress at high temperature is higher than tensile stress at ordinary temperature, that is, it is more preferred that M50H/M50N is 1.1 or more. On the other hand, where M50H/M50N is too large, stiffness at high temperature becomes too high, and run flat durability is rather deteriorated. Therefore, M50H/M50N is preferably 1.3 or less, and more preferably 1.2 or less.

It is preferred that tensile stress in 50% elongation at 100° C. (M50H) of the rubber composition is 3.5 MPa or more. This case increases stiffness of a side wall part at high temperature and can further improve run flat durability. The lower limit of M50H is more preferably 4.0 MPa or more. The upper limit of M50H is not particularly limited, but is preferably 5.5 MPa or less, and more preferably 5.3 MPa or less. Setting M50H to the above upper limit keeps the stiffness at high temperature from being too high and making a side wall part difficult to warp. As a result, run flat durability can be further improved.

On the other hand, tensile stress in 50% elongation at 23° C. (M50N) of the rubber composition is not particularly limited. However, to maintain running performance during general running in good state, the tensile stress is within a range of preferably from 3.0 to 5.0 MPa, and more preferably from 3.5 to 4.5 MPa.

It is preferred that the rubber composition according to the above embodiment contains a quinoline type age resister and at least one age resister other than the quinoline type age resister, other than the mercaptobenzimidazole compound. When two kinds or more of those age resisters are added, run flat durability can be further improved.

The quinoline type age resister includes at least one selected from the group consisting of a 2,2,4-trimethyl-1,2-dihydroquinoline polymer (TMDQ) and 6-ethoxy-2,2,4-trimethyl-1,2-dihydroquinoline (ETMDQ).

Other age resister used together with the quinoline type age resister includes at least one age resister selected from the group consisting of an aromatic secondary amine type age resister, a phenol type age resister, a sulfur type age resister and a phosphite type age resister.

Examples of the aromatic secondary amine type age resister include p-phenylenediamine type age resisters such as N-phenyl-N'-(1,3-dimethylbutyl)-p-phenylenediamine (6PPD), N-isopropyl-N'-phenyl-p-phenylenediamine (IPPD), N,N'-diphenyl-p-phenylenediamine (DPPD), N,N'-di-2-naphthyl-p-phenylenediamine (DNPD), N-(3-methacryloyloxy-2-hydroxypropyl)-N'-phenyl-p-phenylenediamine or N-cyclohexyl-N'-phenyl-p-phenylenediamine; diphenylamine type age resisters such as p-(p-toluenesulfonylamide)diphenylamine, 4,4'-bis(α,α-dimethylbenzyl)dipheylamine (CD), octylated diphenylamine (ODPA) or styrenated diphenylamine; and naphthylamine type age registers such as N-phenyl-1-naphthylamine (PAN) or N-phenyl-2-naphthylamine (PBN). Those can be used in one kind alone or as mixtures of two or more kinds.

Examples of the phenol type age resisters include monophenol type age resisters such as 2,6-di-tert-butyl-4-methylphenol (DTBMP) or styrenated phenol (SP); bisphenol type age resisters such as 2,2'-methylene-bis(4-methyl-6-tert-butylphenol) (MBMBP), 2,2'-methylene-bis(4-ethyl-6-tert-butylphenol) (MBETB), 4,4'-butylidene-bis(3-methyl-6-tert-butylphenol) (BBMTBP) or 4,4'-thio-bis(3-methyl-6-tert-butylphenol) (TBMTBP); and hydroquinone type age resisters such as 2,5-di-tert-butylhydroquinone (DBHQ) or 2,5-di-tert-amylhydroquinone (DAHQ). Those also can be used in one kind alone or as mixtures of two or more kinds.

Examples of the sulfur type age resister include dithiocarbamate type age resisters such as nickel dibutyldithiocarbamate; thiourea type age resisters such as 1,3-bis(dimethylaminopropyl)-2-thiourea or tributylthiourea; and organic thioacid type age resisters such as dilauryl thiodipropionate. The "age resister" defined in the invention does not include the mercaptobenzimidazole compound described above.

The phosphite type age resister includes tris(nonylphenyl)phosphite. Those can be used in one kind alone or as mixtures of two or more kinds.

Of the above, the aromatic secondary amine type age resister is preferred as the other age resister used together with the quinoline type age resister, and p-phenylenediamine type age resister is more preferred.

The amount of the quinoline type age resister added is preferably 20 mass % or more, more preferably 25 mass % or more, and still more preferably 30 mass % or more, based on the total amount of the age resisters in order to increase improvement effect of run flat durability. The upper limit of the amount is preferably 80 mass % or less, and more preferably 75 mass % or less.

The total amount of the age resisters added, that is, the total of the amount of the quinoline type age resister and the amount of the other age resister, is preferably from 1 to 10 parts by mass, more preferably from 1.5 to 7 parts by mass, and still more preferably from 2 to 5 parts by mass, per 100 parts by mass of the diene rubber. The amount of the quinoline type age resister added is preferably from 0.2 to 8 parts by mass, and more preferably from 0.5 to 4 parts by mass, per 100 parts by mass of the diene rubber.

The rubber composition according to the above embodiment can contain a filler such as carbon black, silica and so on. The amount of the filler added is preferably from 20 to 100 parts by mass, more preferably from 30 to 80 parts by mass, and still more preferably from 50 to 70 parts by mass, per 100 parts by mass of the diene rubber. The filler is preferably carbon black alone or a blend of carbon black and silica, and more preferably carbon black. The value of tensile stress of the rubber composition can be controlled by the kind and amount of the filler added.

Carbon black is not particularly limited, and carbon blacks ISAF Grade (N200s), HAF Grade (N300s), FEF Grade (N500s) and GPF Grade (N600s) (all is ASTM Grade) can be used. Carbon black FEF Grade is more preferred.

The rubber composition according to the embodiment can contain various additives generally used in a rubber composition for a tire, such as an oil, zinc flower, stearic acid, a wax, a vulcanizing agent and a vulcanization accelerator, other than the components described above. The vulcanization agent includes a sulfur component such as powdered sulfur, precipitated sulfur, colloidal sulfur, insoluble sulfur and highly dispersible sulfur. Although not particularly limited, the amount of the vulcanizing agent added is preferably from 0.1 to 10 parts by mass, more preferably from 0.5 to 8 parts by mass, and still more preferably from 1 to 5 parts by mass, per 100 parts by mass of the diene rubber. The amount of the vulcanization accelerator added is preferably from 0.1 to 7 parts by mass, and more preferably from 0.5 to 5 parts by mass, per 100 parts by mass of the diene rubber. Where the amount of the oil added is large, tensile stress at high temperature (100° C.) is decreased, and the M50/M50N ratio tends to be decreased. Therefore, the smaller amount is preferred. Although not particularly limited, for example, it is preferred that the oil is added in an amount of 5 parts by mass or less per 100 parts by mass of the diene rubber.

The rubber composition can be prepared by kneading necessary components according to the conventional method using a mixing machine such as Banbury mixer, kneader or roll, generally used.

The rubber composition according to the embodiment as described above contains a dien rubber and a mercaptobenzimidazole compound in given amounts, and preferably further contains a phenyl type thermosetting resin and a methylene donor in a specific mass ratio. Additionally or alternatively, the rubber composition may further contain at least two kinds of age resistors including a quinoline type age resister. This embodiment therefore improves tensile stress at high temperature, and when the M50H/M50N ratio is set to the above-described range, it is possible to remarkably improve run flat durability.

The run flat tire according to the embodiment uses the rubber composition in its side reinforcing rubber part. FIG.

1 is a schematic half cross-sectional view showing one example of the run flat tire. The tire comprises a tread part 1, a pair (right and left) of side wall parts 2 extending inside in a radial direction from both ends thereof, and a pair (right and left) of bead parts 3 provided on the inside ends of the side wall parts 2. Bead cores 4 are embedded in a pair of the bead parts 3, and a carcass ply 5 is embedded such that the both ends are locked by a pair of the bead cores 4. The carcass ply 5 is folded outside from the inside in a tire axial direction around the bead cores 4, and bead fillers 6 made of hard rubber, having a triangular cross-section are provided on the periphery in a radial direction of the bead cores 4 between a main boy of the carcass ply 5 and the folded part. Belt 7 is embedded outside in a radial direction of the carcass ply 5 in the tread part 1, and a belt reinforcing layer 8 is provided on the periphery of the belt 7. Side reinforcing rubber part 9 also called a side pad is provided on the side wall part 2 to increase its stiffness. The side reinforcing rubber part 9 is arranged on a tire inner surface side of the carcass ply 5 in the side wall part 2, and is provided in a crescent cross-sectional shape in a tire meridian cross-section.

In the present embodiment, the side reinforcing rubber part 9 is formed by the rubber composition of the above-described embodiment, and a run flat tire is obtained by, for example, vulcanization molding at a temperature of from 140 to 180° C. according to the conventional method. Namely, a run flat tire of the embodiment is obtained by preparing an unvulcanized tire using the above-described rubber composition as unvulcanized for the side reinforcing rubber part and vulcanizing and molding the unvulcanized tire. The run flat tire obtained has the side reinforcing rubber part 9 comprising the rubber composition of the above-described embodiment. Therefore, deformation of the side reinforcing rubber part during run flat running is suppressed while maintaining running performance (such as running performance to run over a rut) in general running, and run flat durability can be improved.

EXAMPLES

The invention is described in detail by reference to the following examples, but it should be understood that the invention is not construed as being limited to those examples.

Components excluding sulfur, a vulcanization accelerator and a methylene donor were mixed according to the formulation (parts by mass) shown in Table 1 below using Banbury mixer in a first step (non-processing mixing step) (discharge temperature: 160° C.), and sulfur, a vulcanization accelerator and a methylene donor were then mixed with the thus-obtained mixture in a second step (final mixing step) (discharge temperature: 100° C.). Thus, a rubber composition for a side reinforcing rubber part was prepared.

Details of each component in Table 1 are as follows.

NR: Natural rubber, RSS #3

BR1: "BR01" (cis-1,4 bond content: 95%) manufactured by JSR Corporation

BR2: Nd-BR (polybutadiene rubber polymerized with a neodymium type catalyst, "BR40" (cis-1,4 bond content: 98%) manufactured by KUNHO PETROCHEMICAL Carbon black: N500, "SEAST SO" manufacture by Tokai Carbon Co., Ltd.

Stearic acid: "LUNAC S-20" manufactured by Kao Corporation

Phenol type resin: Oil-modified novolac phenol resin, "SUMILITE RESIN PR13349" manufactured by Sumitomo Bakelite Co., Ltd.

Zinc flower: "Zinc Flower Grade 1" manufactured by Mitsui Mining & Smelting Co., Ltd.

Age resister 1: N-phenyl-N'-(1,3-dimethylbutyl)-p-phenylenediamine, "ANTIGEN 6C" manufactured by Sumitomo Chemical Co., Ltd.

Age resister 2: 2,2,4-Trimethyl-1,2-dihydroquinoline polymer (TMDQ), "ANTAGE RD" manufactured by Kawaguchi Chemical Industry Co., Ltd.

Vulcanization accelerator: Sulfenamide type, "NOCCELER NS-P" manufactured by Ouchi Shinko Chemical Industrial Co., Ltd.

Methylene donor: Hexamethoxymethylmelamine, "CYREZ 964RPC" manufactured by Mitsui Cytech Ltd.

Sulfur: "MU-CRON OT-20" manufactured by Shikoku Chemicals Corporation

Compound 1: 2-Mercaptobenzimidazole, "ANTAGE MB" manufactured by Kawaguchi Chemical Industry Co., Ltd.

Compound 2: Zn salt of 2-mercaptobenzimidazole, "NOCRAC MBZ" manufactured by Ouchi Shinko Chemical Industrial Co., Ltd.

Compound 3: 2-Mercaptomethylbenzimidazole, "NOCRAC MMB" manufactured by Ouchi Shinko Chemical Industrial Co., Ltd.

Using a test piece having a thickness of 2 mm vulcanized at 160° C. for 25 minutes of each rubber composition, tensile stress in 50% elongation at 23° C. (M50N) and tensile stress in 50% elongation at 100° C. (M50) were measured, and a ratio of those (M50H/M50N) was obtained. A passenger car radial tire (run flat tire) having a tire size of 225/45ZR18 was produced by the conventional method using each rubber composition in a side reinforcing rubber side, and ran flat durability was evaluated. The results obtained are shown in Table 1. Each measurement and evaluation method is as follow.

Hardness: According to JIS K6253, hardness of a test piece was measured at 23° C. by durometer type A, and was indicated by an index relative to the value of Comparative Example 1 which is taken as 100.

Tensile product: According to JIS K6251, tensile test was conducted at a room temperature of 23° C., and (breaking strength TB×breaking elongation EB) was defined as tensile product.

M50N: According to JIS K6251, a test piece (dumbbell shape, type 3) was subjected to a tensile test at a room temperature of 23° C., and tensile stress in 50% elongation was obtained.

M50H: According to JIS K6251, a test piece (dumbbell shape, type 3) was maintained in a thermostat bath of 100° C. for 1 hour or more, a tensile test was then conducted in an atmosphere of 100° C. by a tensile tester equipped with a thermostat bath, and tensile stress in 50% elongation was obtained.

Run flat durability: Drum tester with a diameter of 1,700 mm having a smooth surface made of iron was used. Tire inner pressure was 0 kPa, and load was 65% of loading capacity corresponding to load index. Speed was increased to 80 km/h in 5 minutes from test start, and a tire was run on the drum tester until tire failure occurs in a speed of 80 km/h. Running distance until the failure occurs was indicated by an index relative to the value of Comparative Example 1 which is taken as 100. Larger index means that the run flat durability is excellent.

TABLE 1

| | Comparative Example 1 | Comparative Example 2 | Comparative Example 3 | Comparative Example 4 | Example 1 | Example 2 | Example 3 | Example 4 | Example 5 | Example 6 |
|---|---|---|---|---|---|---|---|---|---|---|
| NR | 40 | 40 | 40 | 40 | 40 | 40 | 40 | 40 | 40 | 30 |
| BR1 | 60 | 60 | 60 | 60 | 60 | 60 | | 60 | 60 | 70 |
| BR2 | | | | | | | 60 | | | |
| Carbon black | 60 | 65 | 60 | 60 | 60 | 60 | 60 | 60 | 60 | 60 |
| Stearic acid | 2 | 2 | 2 | 2 | 2 | 2 | 2 | 2 | 2 | 2 |
| Phenol resin | 3 | 5 | 3 | | 3 | 3 | 3 | 3 | 3 | 3 |
| Zinc flower | 3 | 3 | 3 | 3 | 3 | 3 | 3 | 3 | 3 | 3 |
| Age resister 1 | 1.5 | 1.5 | 1.5 | 1.5 | 1.5 | 1.5 | 1.5 | 1.5 | 1.5 | 1.5 |
| Age resister 2 | 1.5 | 1.5 | 1.5 | 1.5 | 1.5 | 1.5 | 1.5 | 1.5 | 1.5 | 1.5 |
| Compound 1 | | | 6.0 | | 0.5 | 1.2 | 0.5 | | | 0.5 |
| Compound 2 | | | | | | | | 0.5 | | |
| Compound 3 | | | | | | | | | 0.5 | |
| Vulcanization accelerator | 2 | 2 | 2 | 2 | 2 | 2 | 2 | 2 | 2 | 2 |
| Methylene donor | 1 | 5 | 1 | | 1 | 1 | 1 | 1 | 1 | 1 |
| Sulfur | 4 | 4 | 4 | 4 | 4 | 4 | 4 | 4 | 4 | 4 |
| Phenol resin/methylene donor | 3.0 | 1.0 | 3.0 | — | 3.0 | 3.0 | 3.0 | 3.0 | 3.0 | 3.0 |
| Hardness | 100 | 107 | 101 | 94 | 100 | 100 | 102 | 100 | 100 | 100 |
| Tensile product | 100 | 85 | 84 | 89 | 112 | 118 | 105 | 113 | 114 | 107 |
| Run flat durability | 100 | 93 | 86 | 83 | 108 | 113 | 112 | 109 | 110 | 108 |
| M50H/M50N | 1.1 | 1.4 | 1.1 | 0.9 | 1.1 | 1.1 | 1.2 | 1.1 | 1.1 | 1.1 |

As is seen from the results shown in Table 1, tensile product could be increased without decreasing hardness in Examples 1 to 6 in which a mercaptobenzimidazole compound was used in a given amount, as compared with Comparative Example 1 that is a control in which a mercaptobenzimidazole compound was not used, and as a result, run flat durability could be greatly improved.

On the other hand, Comparative Example 2 in which a mercaptobenzimidazole compound was not used and a phenol resin/methylene donor ratio was low, Comparative Example 4 in which a phenol resin was not used, and Comparative Example 3 in which a mercaptobenzimidazole compound was excessively used each showed the result that run flat durability was poor.

What is claimed is:

1. A run flat tire having a side wall part reinforced by a side reinforcing rubber part,
   wherein the side reinforcing rubber part is formed by a rubber composition which comprises 100 parts by mass of a diene rubber containing natural rubber and polybutadiene rubber, and from 0.5 to 1.2 parts by mass of a mercaptobenzimidazole compound, which is 2-mercaptobenzimidazole or the metal salt thereof, or at least one 2-mercaptobenzimidazole type compound selected from 2-mercaptobenzimidazole having at least one alkyl substituent in an aromatic ring and the metal salt thereof, and
   the rubber composition further comprises a phenol type thermosetting resin and a methylene donor, and a mass ratio of the contained amount of the phenol type thermosetting resin to the amount of the methylene donor contained is 1.5 times or more.

2. The run flat tire according to claim 1, wherein the rubber composition has a ratio (M50H/M50N) of tensile stress (M50H) in 50% elongation at a measurement temperature of 100° C. to tensile stress (M50N) in 50% elongation at a measurement temperature of 23° C. of from 1.0 to 1.3.

3. The run flat tire according to claim 2, wherein the rubber composition further contains at least one age resister selected from the group consisting of an aromatic secondary amine type age resister, a phenol type age resister, a sulfur type age resister and a phosphite type age resister, and a quinoline type age resister.

4. The run flat tire according to claim 1, wherein the rubber composition further contains at least one age resister selected from the group consisting of an aromatic secondary amine type age resister, a phenol type age resister, a sulfur type age resister and a phosphite type age resister, and a quinoline type age resister.

5. The run flat tire according to claim 1, wherein the amount of the phenol type thermosetting resin is from 1 to 10 parts by mass per 100 parts by mass of the diene rubber.

* * * * *